United States Patent
Chen et al.

(10) Patent No.: US 10,505,452 B2
(45) Date of Patent: Dec. 10, 2019

(54) FREQUENCY CONTROL CIRCUIT, CONTROL METHOD AND SWITCHING CONVERTER

(71) Applicant: Silergy Semiconductor Technology (Hangzhou) LTD, Hangzhou, ZheJiang Province (CN)

(72) Inventors: Hao Chen, Hangzhou (CN); Le Li, Hangzhou (CN); Xinlei Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/183,916

(22) Filed: Nov. 8, 2018

(65) Prior Publication Data
US 2019/0149046 A1    May 16, 2019

(30) Foreign Application Priority Data
Nov. 14, 2017    (CN) .......................... 2017 1 1122662

(51) Int. Cl.
*H02M 3/157* (2006.01)
*H02M 3/158* (2006.01)
*H02M 1/08* (2006.01)
*H02M 3/156* (2006.01)
*H02M 1/00* (2006.01)

(52) U.S. Cl.
CPC ........... *H02M 3/1582* (2013.01); *H02M 1/08* (2013.01); *H02M 3/156* (2013.01); *H02M 2001/0003* (2013.01); *H02M 2003/1566* (2013.01)

(58) Field of Classification Search
CPC ......... H02M 3/157; H02M 2001/0003; H02M 2001/0012
See application file for complete search history.

(56) References Cited

U.S. PATENT DOCUMENTS

| | | | |
|---|---|---|---|
| 6,147,478 A | 11/2000 | Skelton et al. | |
| 8,067,925 B2 | 11/2011 | Grimm | |
| 8,659,282 B2 | 2/2014 | Chen | |
| 8,803,563 B2 | 8/2014 | Deng et al. | |
| 9,287,773 B2 | 3/2016 | Jin | |
| 9,331,588 B2 | 5/2016 | Chen | |
| 9,529,373 B2 | 12/2016 | Yuan | |
| 9,698,690 B2 | 7/2017 | Hang | |
| 2011/0215782 A1 | 9/2011 | Cheng | |
| 2012/0212204 A1* | 8/2012 | Philbrick | H02M 3/156 323/284 |
| 2014/0268925 A1* | 9/2014 | Lee | H02M 3/33507 363/21.18 |
| 2015/0077073 A1 | 3/2015 | Yu et al. | |
| 2015/0362937 A1* | 12/2015 | Wang | H02M 3/156 323/281 |
| 2016/0036324 A1* | 2/2016 | Hofmann | H02M 3/156 315/210 |
| 2016/0056730 A1 | 2/2016 | Yan et al. | |

* cited by examiner

*Primary Examiner* — Harry R Behm
(74) *Attorney, Agent, or Firm* — Michael C. Stephens, Jr.

(57) ABSTRACT

A frequency control circuit, applied in a switching converter, can be configured to: regulate an off time of a power transistor of the switching converter in one switching cycle according to an on time of the power transistor, or regulate the on time of the power transistor in one switching cycle according to the off time of the power transistor; and maintain an operating frequency of the switching converter to be within a predetermined range.

15 Claims, 8 Drawing Sheets

FREQUENCY CONTROL CIRCUIT, CONTROL METHOD AND SWITCHING CONVERTER

RELATED APPLICATIONS

This application claims the benefit of Chinese Patent Application No. 201711122662.6, filed on Nov. 14, 2017, which is incorporated herein by reference in its entirety.

FIELD OF THE INVENTION

The present invention generally relates to the field of power electronics, and more particularly to frequency control circuits and methods for switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one approach for switching power supplies with a fixed switching frequency, a pulse width modulation method with a fixed frequency can be utilized. This approach is relatively common and simple in circuit design, but one disadvantage is that in continuous conduction mode (CCM), when the duty cycle is greater than about 50%, sub-harmonic oscillation can occur, which may require slope compensation to address. In another approach for switching power supplies with a fixed switching frequency, a constant on/off time control method can be utilized. This approach may be suitable for high frequency switching power supplies, where the switching frequency is often above several hundred kilohertz. However, when applying this approach to low frequencies, a low-pass filter may need to be integrated, which can result in increased chip costs.

In one embodiment, a frequency control circuit applied in a switching converter, can be configured to: (i) regulate an off time of a power transistor of the switching converter in one switching cycle according to an on time of the power transistor, or regulate the on time of the power transistor in one switching cycle according to the off time of the power transistor; and (ii) maintain an operating frequency of the switching converter to be within a predetermined range.

Figure 1:
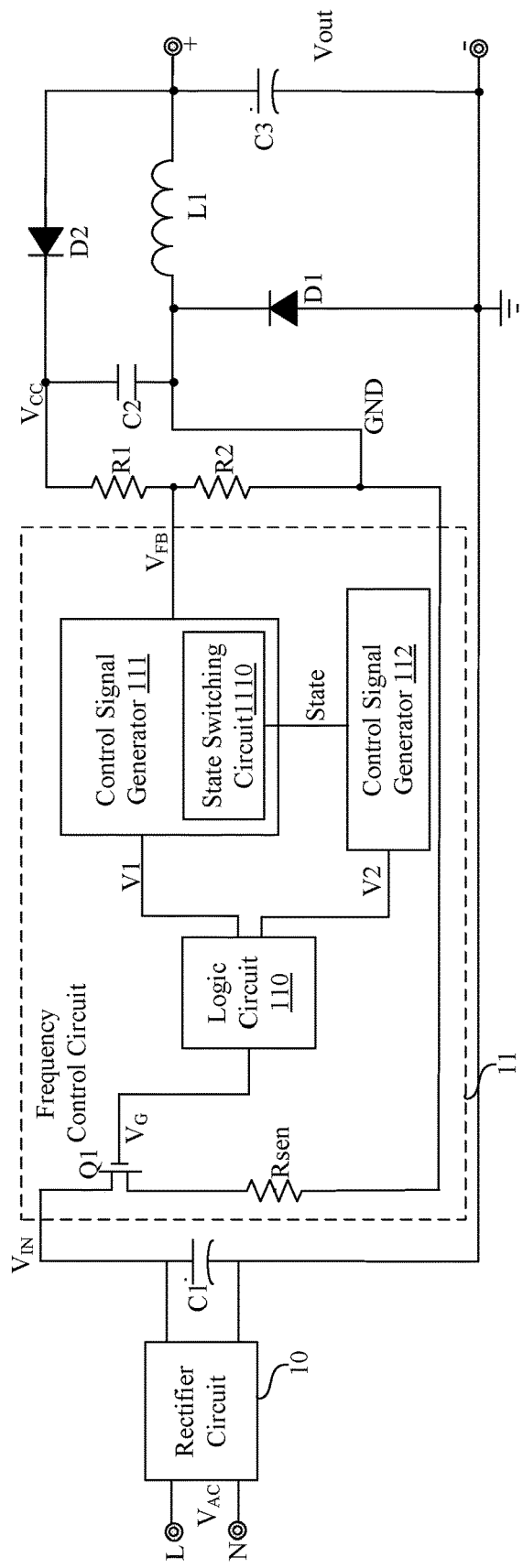
FIG. 1 is a schematic block diagram of a first example frequency control circuit applied in a switching converter, in accordance with embodiments of the present invention.

Referring now to FIG. 1, shown is a schematic block diagram of a first example frequency control circuit applied in a switching converter, in accordance with embodiments of the present invention. In this particular example, the switching converter is a buck-type converter, and AC input voltage $V_{AC}$ may be converted to DC voltage $V_{IN}$ through rectifier circuit 10 and input capacitor C1. DC voltage $V_{IN}$ may be input to a first terminal of power transistor Q1, and a second terminal of power transistor Q1 can be coupled to a first terminal of inductor L1 through sampling resistor Rsen. The first terminal of inductor L1 can connect to a first terminal of freewheeling diode D1, and a second terminal of freewheeling diode D1 can connect to ground. A second terminal of inductor L1 can connect to output capacitor C3, and a second terminal of output capacitor C3 can connect to ground. An output terminal of the switching converter may generate output voltage Vout. Output voltage Vout can be sampled by diode D2 and capacitor C2 in order to obtain Voltage $V_{CC}$, and voltage $V_{CC}$ may be divided by resistors R1 and R2 in order to obtain feedback signal $V_{FB}$ of the output voltage.

In this particular example, the switching converter is a buck converter, and those skilled in the art will recognize that other switching converters with different topology structures (e.g., a buck-boost topology, a forward topology, a flyback topology, etc.) may alternatively be utilized. In this particular example, the first terminal of freewheeling diode D1 is the cathode, and a second terminal is the anode. Those skilled in the art will recognize that other common devices (e.g., MOS transistor, a BJT transistor, etc.) may alternatively be utilized to replace freewheeling diode D1, and can perform the same or similar adaptive transformation on the circuitry.

Frequency control circuit 11 can include control signal generators 111 and 112, and logic circuit 110. Control signal generator 111 can also include state switching circuit 1110.

Control signal generator 111 can receive feedback signal $V_{FB}$, and may generate control signal V1 according to a comparison signal and a maximum on time or off time of the power transistor in the present operating state. Control signal generator 112 can generate control signal V2 according to a preset on time or off time of the power transistor in the present operating state. Logic circuit 110 may have a first input terminal for receiving control signal V1, a second input terminal for receiving control signal V2, and an output terminal for generating switching control signal $V_G$ of the power transistor. Control signal generator 112 can determine the preset on time or off time of the power transistor according to state signal State, which can be generated by state switching circuit 1110 in the present operating state.

Figure 2:
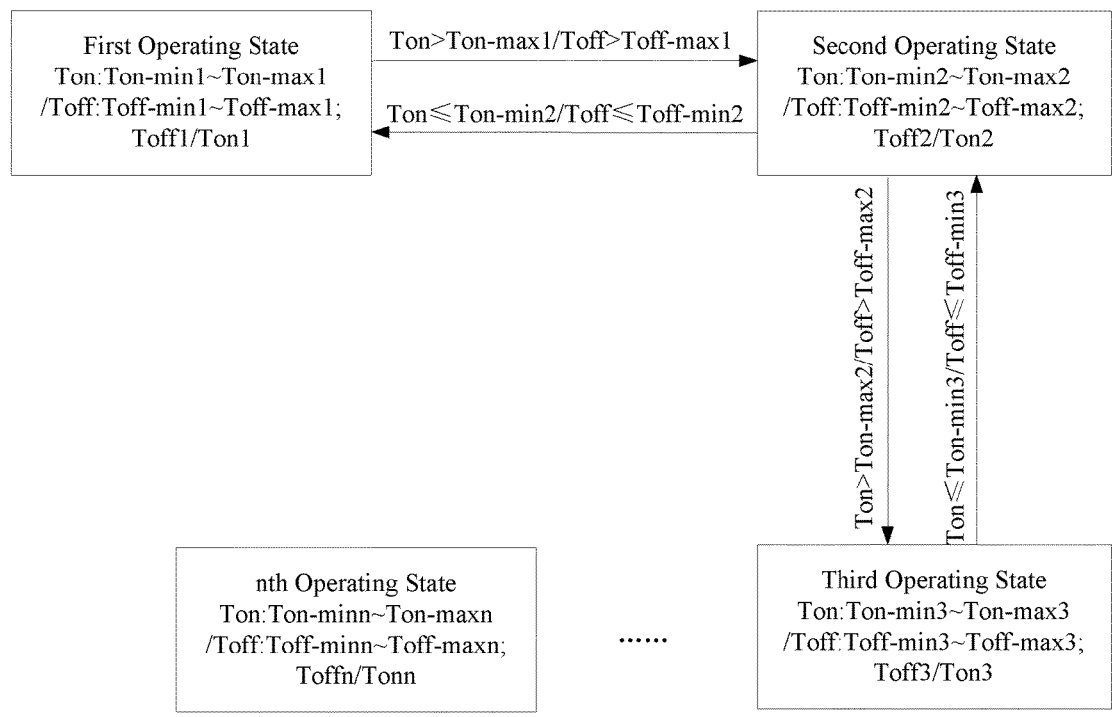
FIG. 2 is a schematic block diagram of a first example state switching circuit, in accordance with embodiments of the present invention.

Referring now to FIG. 2, shown is a schematic block diagram of a first example state switching circuit, in accordance with embodiments of the present invention. In this particular example, state switching circuit 1110 may have n operating states (e.g., n≥2), which can include a first operating state, a second operating state, . . . , through an $n^{th}$ operating state. Each operating state may have a predetermined off time for switching the operating states according to the on time of the power transistor in the present cycle. The corresponding off time of the power transistor may be first off time Toff1, second off time Toff2, . . . , and $n^{th}$ off time Toffn. In addition, off time Toff in each operating state may be sequentially decreased. The corresponding on time of the power transistor can be first minimum on time Ton-min1 and first maximum on time Ton-max1, second minimum on time Ton-min2 and second maximum on time Ton-max2, . . . , through $n^{th}$ minimum on time Ton-minn and $n^{th}$ maximum on time Ton-maxn, respectively.

Alternatively, each operating state may have a predetermined on time for switching the operating states according to the off time of the power transistor in the present cycle. The corresponding on time of the power transistor may be first on time Ton1, second on time Ton2, . . . , through $n^{th}$ on time Tonn. In addition, on time Ton in each operating state may be sequentially decreased. The corresponding off time of the power transistor can be first minimum off time Toff-min1 and first maximum off time Toff-max1, second minimum off time Toff-min2 and second maximum off time Toff-max2, . . . , through $n^{th}$ minimum off time Toff-minn and $n^{th}$ maximum off time Toff-maxn. When the on time or off time of the power transistor in the present cycle reaches the maximum value in the present operating state, the operating state can be switched (e.g., turned on or off) to a next operating state. When the on time or off time of the power transistor in the present cycle reaches the minimum value in the present operating state, the operating state can be switched to a previous operating state. For example, when the system is in the second operating state, on time Ton of the power transistor may be greater than second maximum on time Ton-max2, and the circuit may switch to the third operating state, such that off time Toff of the power transistor decreases.

When on time Ton of the power transistor is less than or equal to second minimum on time Ton-min2, the circuit may switch to the first operating state, such that off time Toff of the power transistor increases. Alternatively, when the system is in the second operating state, off time Toff of the power transistor may be greater than second maximum off time Toff-max2, and the circuit may to the third operating state, such that on time Ton of the power transistor decreases. When off time Toff of the power transistor is less than or equal to second minimum on time Toff-min2, the circuit may switch to the first operating state, such that on time of the power transistor increases. In particular embodiments, off time or on time of the power transistor can be controlled by detecting the on time or off time range in every switching cycle, in order to control the operation frequency of the switching converter to be within a predetermined range.

Figure 3:
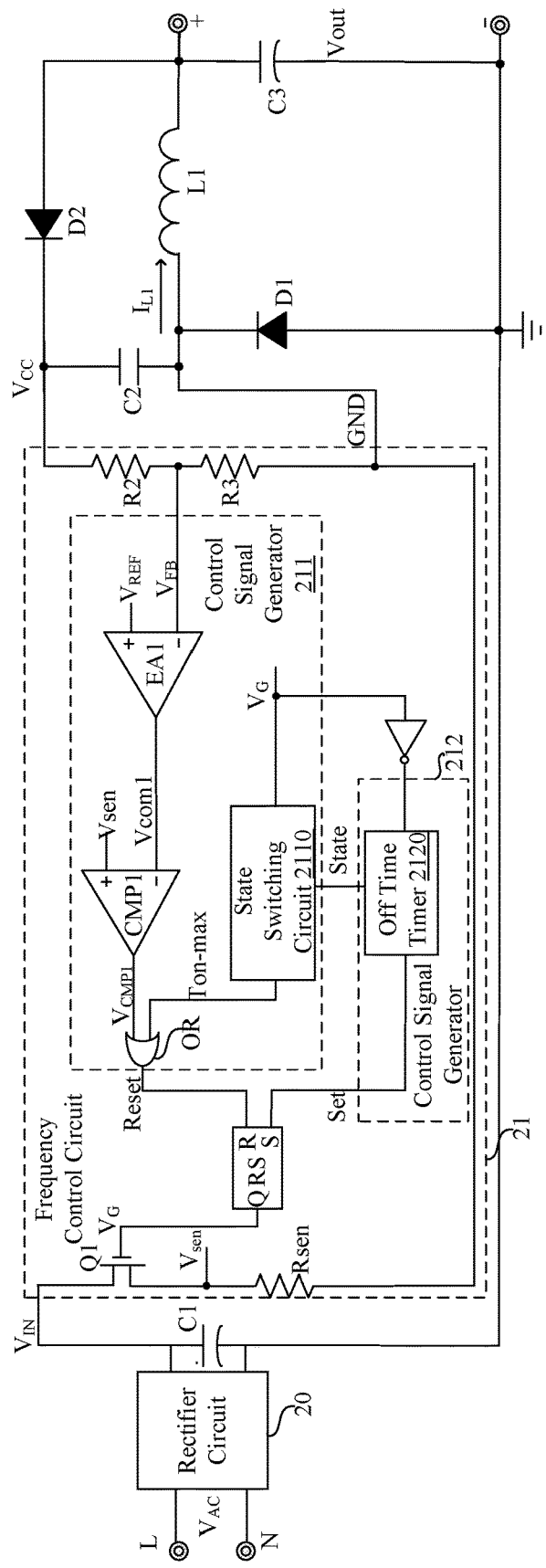
FIG. 3 is a schematic block diagram of a second example frequency control circuit applied in a switching converter, in accordance with embodiments of the present invention.

Referring now to FIG. 3, shown is a schematic block diagram of a second example frequency control circuit applied in a switching converter, in accordance with embodiments of the present invention. In this particular example, frequency control circuit 21 can include control signal generators 211 and 212. Control signal generator 211 can include OR-gate OR, comparator CMP1, state switching circuit 2110, and error amplifier EA1. Error amplifier EA1 can include a non-inverting input terminal for receiving reference voltage $V_{REF}$, an inverting input terminal for receiving feedback signal $V_{FB}$, and an output terminal for providing compensation signal Vcom1.

Comparator CMP1 may have a non-inverting input terminal for receiving current sampling signal Vsen obtained by sampling resistor Rsen, an inverting input terminal for receiving compensation signal Vcom1, and an output terminal for generating comparison signal $V_{CMP1}$. State switching circuit 2110 can receive switching control signal $V_G$ of power transistor Q1, can generate maximum on time Ton-max of the power transistor in the present operating state, and may switch the operating state according to the on time of the power transistor in the present cycle. OR-gate OR can receive comparison signal $V_{CMP1}$ and maximum on time Ton-max in the present operating state, and may generate reset signal Reset.

Control signal generator 212 can include off time timer 2120. Off time timer 2120 can receive state signal State that is generated by state switching circuit 2110, and may determine the moment at which the off time of the power transistor begins to be timed according to the low level of switching control signal $V_G$ of power transistor Q1. After the timing operation is completed, off time timer 2120 can generate set signal Set. Frequency control circuit 21 can also include logic circuit RS, which can receive set signal Set and reset signal Reset, and may generate switching control signal $V_G$ of power transistor Q1.

In frequency control circuit 21, when feedback voltage $V_{FB}$ is relatively large, an error between feedback voltage $V_{FB}$ and reference voltage $V_{REF}$ may become smaller, and compensation voltage Vcom1 generated by error amplifier EA can decrease. Then, current sampling signal Vsen may be greater than compensation signal Vcom1, and comparison signal $V_{CMP1}$ output by comparator CMP1 can be positive, such that the OR-gate may activate reset signal Reset, and logic circuit RS can generate a low level. Alternatively, state switching circuit 2110 can determine the on time of the power transistor in the present operating state according to switching control signal $V_G$ of the power transistor. When on time Ton of the power transistor in the present operating state reaches the maximum, the OR-gate can activate reset signal Reset, and logic circuit RS can generate a low level. Off time timer 2120 may receive state signal State from state switching circuit 2110 to determine the off time of the power transistor, and can determine the moment at which the off time of the power transistor begins to be timed according to the low level of switching control signal $V_G$ of the power transistor. After the timing operation has completed, off time timer 2120 may activate set signal Set, and then logic circuit RS can output a high level.

Figure 4:
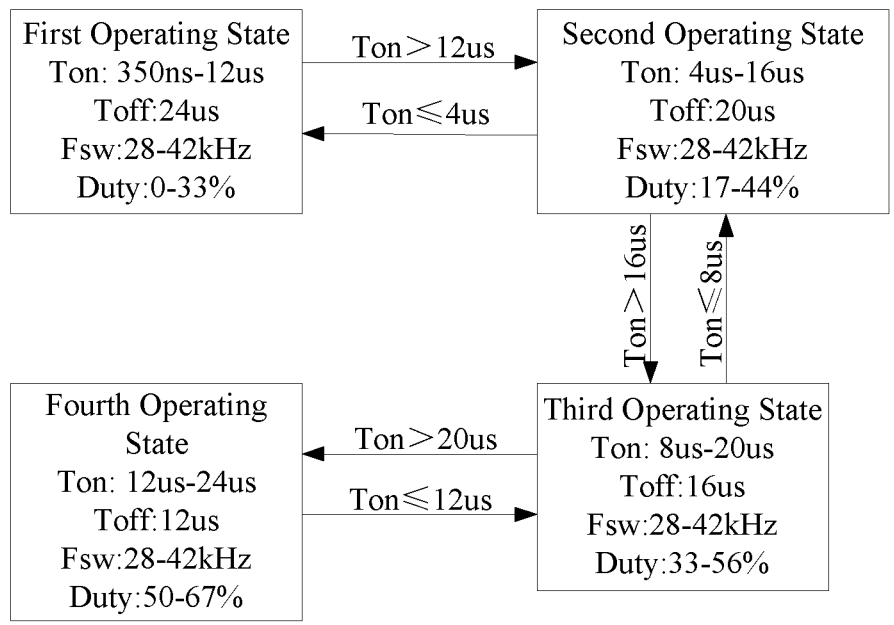
FIG. 4 is a schematic block diagram of a second example state switching circuit, in accordance with embodiments of the present invention.

Referring now to FIG. 4, shown is a schematic block diagram of a second example state switching circuit, in accordance with embodiments of the present invention. In this particular example, the state switching circuit may have four operating states, and the circuit may operate in the first operating state as its default state. For example, in the first operating state, on time Ton of the power transistor can be between 350 ns and 12 us. That is, for example first minimum on time Ton-min1 of the power transistor in the first operating state is 350 ns, and first maximum on time Ton-max1 of the power transistor in the first operating state is 12 us. For example, the first off time of the power transistor is 24 us, and the duty cycle range is 0-33%. For example, when on time Ton>12 us, the state switching circuit may switch from the first operating state to the second operation state, and off time Toff of the power transistor may decrease from 24 us to 20 us.

Also for example, when the system works in the second operating state, on time Ton of the power transistor can be between 4 us and 16 us, second off time Toff of the power transistor can be 20 us, and the duty cycle range may be increased to 17%-44%. For example, when on time Ton>16 us, the state switching circuit may switch from the second operating state to the third operating state, and off time Toff of the power transistor can decrease from 20 us to 16 us. For example, when on time Ton≤4 us, the state switching circuit may switch from the second operating state to the first operating state, and off time Toff of the power transistor can increase from 20 us to 24 us. It can be seen from the example of FIG. 4 that each operating state may correspond to a fixed off time Toff of the power transistor, and at most one state can be changed in each switching cycle. Off time Toff of the power transistor may be controlled by detecting the range of on time Ton of the power transistor in every switching cycle, such that the switching frequency of the system may be controlled to be within a predetermined range (e.g., from about 28 kHz to about 42 kHz).

The state switching circuit can be set to have a plurality of operating states according to the specific circuit structures and practical application requirements. In particular embodiments, as long as the operation frequency is kept within the predetermined range, the on time and off time of the power transistor in every operating state can be flexibly set. When the maximum duty cycle in the present operating state fails to meet particular output requirements, on time Ton of the power transistor may reach the maximum on time Ton-max, and then the state switching circuit can switch to the next operating state after one switching cycle. In this way, requirement of a larger duty cycle with a smaller frequency variation range can be met by increasing Ton-max and reducing Toff.

Figure 5:
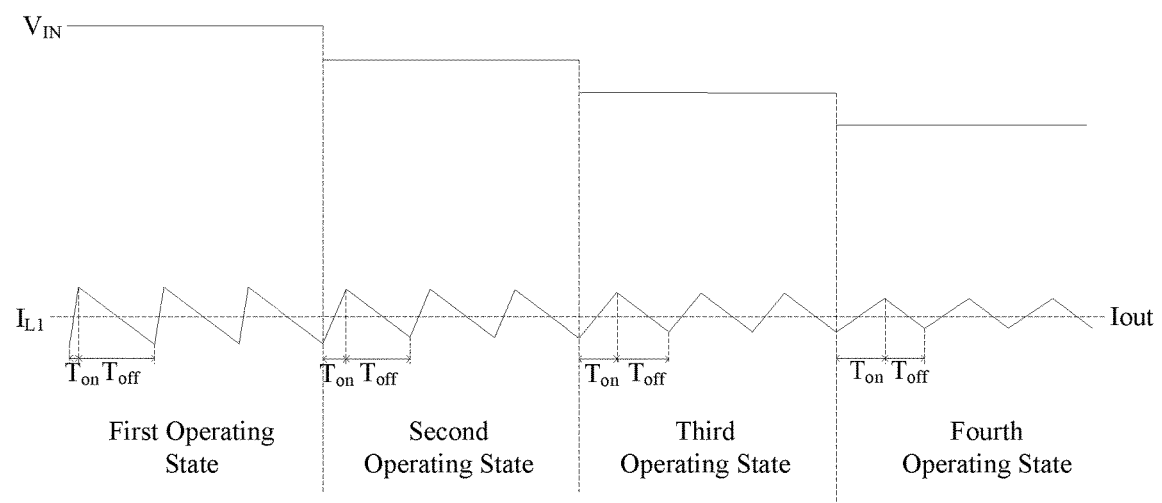
FIG. 5 is a waveform diagram of an example inductor current corresponding to different input voltages, in accordance with embodiments of the present invention.

Referring now to FIG. 5, shown is a waveform diagram of an example inductor current corresponding to different input voltages, in accordance with embodiments of the present invention. In this particular example, it can be seen that when input voltage $V_{IN}$ decreases, the duty cycle in the present operating state may not ensure the stability of the output voltage. Thus, on time Ton of the power transistor may reach the maximum on time Ton-max, and then the state of the switching circuit can switch to the next operating state after one switching cycle. In this way, a larger duty cycle can be obtained by increasing on time Ton and reducing off time Toff of the power transistor, and the switching frequency may be controlled to be within a certain range. Similarly, when input voltage $V_{IN}$ increases, in order to ensure the stability of the output voltage, the duty cycle may also decrease. Further, on time Ton of the power transistor in the present operating state may reach the minimum on time Ton-min, and then the state switching circuit can be switched to the previous operating state after one switching cycle, in order to control the switching frequency to be within a certain range.

Figure 6:
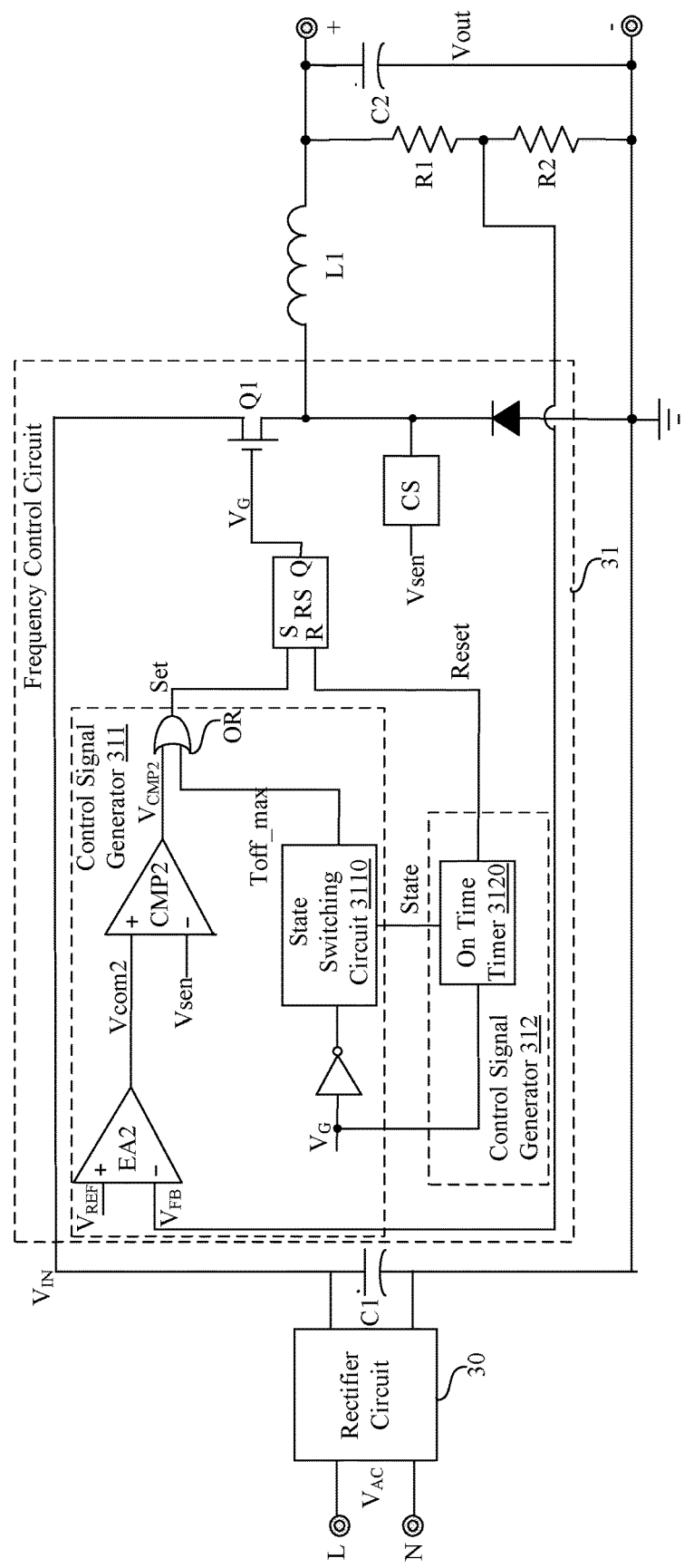
FIG. 6 is a schematic block diagram of a third example frequency control circuit applied in a switching converter, in accordance with embodiments of the present invention.

Referring now to FIG. 6, shown is a schematic block diagram of a third example frequency control circuit applied in a switching converter, in accordance with embodiments of the present invention. In this particular example, feedback signal $V_{FB}$ can be directly obtained by dividing output voltage Vout through series coupled resistors R1 and R2. Frequency control circuit 31 can include control signal generators 311 and 312. For example, control signal generator 311 can include OR-gate OR, comparator CMP2, state switching circuit 3110, and error amplifier EA2. Error amplifier EA2 may have a non-inverting input terminal for receiving reference voltage $V_{REF}$, an inverting input terminal for receiving feedback signal $V_{FB}$, and an output terminal for generating compensation signal Vcom2.

Comparator CMP2 may have a non-inverting input terminal for receiving compensation signal Vcom2, an inverting input terminal for receiving current sampling signal Vsen that is obtained by sampling the inductor current through current sampling module CS when switching control signal $V_G$ is at a low level, and an output terminal for generating comparison signal $V_{CMP2}$. State switching circuit 3110 can receive the low level of switching control signal $V_G$, may output maximum off time Toff-max of the power transistor in the present operating state, and can switch the operating states according to the off time of the power transistor in the present cycle. OR-gate OR can receive comparison signal $V_{CMP2}$, and maximum off time signal Toff-max of the power transistor in the present operating state, and can generate set signal Set.

For example, control signal generator 312 can include on time timer 3120. On time timer 3120 may receive state signal State that is generated by state switching circuit 3110, and can determine the moment at which the on time of the power transistor begins to be timed according to switching control signal $V_G$ of the power transistor. After the timing operation has completed, on time timer 3120 may activate reset signal Reset. Frequency control circuit can also include logic circuit RS, which can receive set signal Set and reset signal Reset, and may generate switching control signal $V_G$ of power transistor Q1.

In the frequency control circuit, when feedback voltage $V_{FB}$ is relatively small, an error between feedback voltage $V_{FB}$ and reference voltage $V_{REF}$ can become larger, and compensation voltage Vcom2 generated by error amplifier EA2 can increase. Then, current sampling signal Vsen may be less than compensation signal Vcom2, and comparison signal $V_{CMP2}$ generated by comparator CMP2 can be positive, such that the OR-gate activates reset signal Reset, and logic circuit RS generates a low level output. Alternatively, state switching circuit 3110 may determine the off time of the power transistor in the present operating state according to the low level of switching control signal $V_G$ of the power transistor. When the off time Toff of the power transistor in the present operating state reaches the maximum, OR-gate OR may activate set signal Set, and logic circuit RS can output a high level. On time timer 3120 can receive state signal State generated by the state switching circuit, in order to determine the on time of the power transistor, and to determine the moment at which the on time of the power transistor begins to be timed according to switching control signal $V_G$ of the power transistor. After the timing operation has completed, on time timer 3120 may activate reset signal Reset, and logic circuit RS can output a low level.

Figure 7:
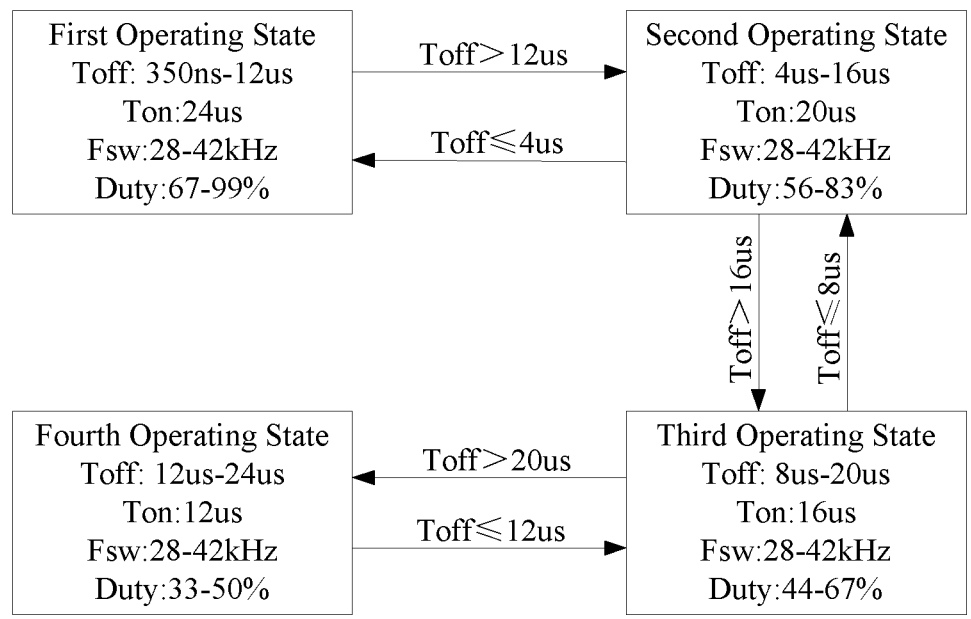
FIG. 7 is a schematic block diagram of a third example state switching circuit, in accordance with embodiments of the present invention.

Referring now to FIG. 7, shown is a schematic block diagram of a third example state switching circuit, in accordance with embodiments of the present invention. In this particular example, the state switching circuit may have four operating states, and the system can operate in the first operating state as its default state. In this state, off time Toff of the power transistor can be between 350 ns and 12 us. That is, first minimum off time Toff-min1 of the power transistor in the first operating state can be 350 ns, and first maximum off time Toff-max1 of the power transistor in the first operating state can be 12 us. First on time of the power transistor may be 24 us, and the duty cycle range can be from about 67% to about 99%. For example, when off time Toff>12 us, the state switching circuit may be switched from the first operating state to the second operation state, and on time Ton of the power transistor can decrease from 24 us to 20 us. Similarly, for example, when the system operates in the second operating state, off time Toff of the power transistor can be between 4 us and 16 us, second on time Ton of the power transistor may be 20 us, and the duty cycle range can be decreased to from about 56% to about 83%.

For example, when off time Toff>16 us, the state switching circuit may switch from the second operating state to the third operating state, and on time Ton of the power transistor can decrease from 20 us to 16 us. Also for example, when off time Toff≤4 us, the state switching circuit may switch from the second operating state to the first operating state, and on time Ton of the power transistor can increase from 20 us to 24 us. It can be seen from FIG. 7 that, each operating state may correspond to a fixed on time Ton of the power transistor and at most one state can be changed in each switching cycle. On time Ton of the power transistor can be controlled by detecting the range of off time Toff of the power transistor in every switching cycle, such that the switching frequency of the system may be controlled within a predetermined range (e.g., from about 28 kHz to about 42 kHz). The state switching circuit can be set to have a plurality of operating states according to the specific circuit structures and practical application requirements. As long as the operation frequency remains within the predetermined range, the on time and off time of the power transistor in every operating state can be flexibly set.

Figure 8:
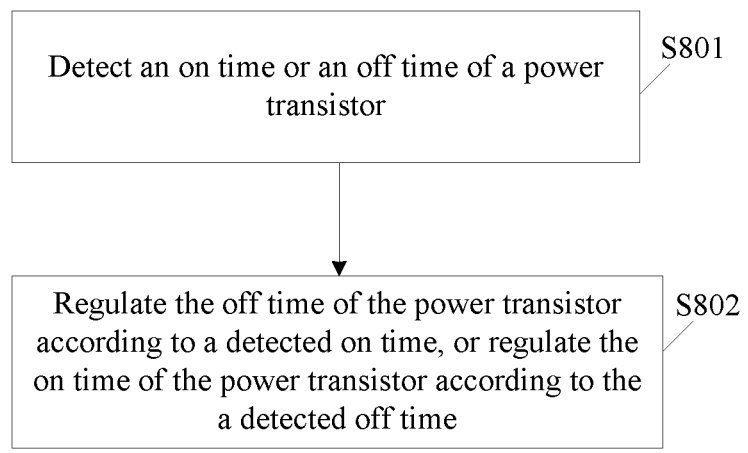
FIG. 8 is a flow diagram of an example frequency control method, in accordance with embodiments of the present invention.

Referring now to FIG. 8, shown is a flow diagram of an example frequency control method, in accordance with embodiments of the present invention. This example frequency control method may control the switching states of the power transistor in a switching converter, and can include, at S801, detecting the on time or the off time of the power transistor. At S802, the off time of the power transistor may be regulated according to the detected on time of the power transistor. Alternatively, the on time of the power transistor may be regulated according to the detected off time of the power transistor. For example, the frequency control method can include presetting a plurality of operating states, where each operating state has a predetermined off time of the power transistor, and switching between the plurality of operating states according to the on time of the power transistor in the present cycle in order to select a matched off time of the power transistor.

The example method can additionally or alternatively include presetting a plurality of operating states, where each operating state has a predetermined on time of the power transistor, and switching between the plurality of operating states according to the off time of the power transistor in the present cycle in order to select a matched on time of the power transistor. Switching the operating states can include switching to another operating state when the on time or off time of the power transistor in the present cycle reaches the maximum value or the minimum value in the present cycle.

For example, switching to the next operating state can occur when the on time or off time of the power transistor in the present cycle reaches the maximum value of the present operating state. Additionally or alternatively switching to the previous operating state can occur when the on time or off time of the power transistor in the present cycle reaches the minimum value of the present operating state. For example, regulating the off time of the power transistor according to the on time of the power transistor can include, in every switching cycle, when the on time of the power transistor in the present cycle reaches the maximum value of the present cycle, or when the current sampling signal is greater than or equal to the compensation signal which represents the error information of the output signal, turning off the power transistor. In addition, in the present operating state, when the off time of the power transistor is timed out, the power transistor can be turned on. Alternatively or additionally, in every switching cycle, when the on time of the power transistor in the present cycle reaches the maximum value of the present cycle, or when the resonance voltage reaches the valley value, the power transistor can be turned off. In the present operating state, when the operation for timing the off time of the power transistor is completed, the power transistor can be turned on.

Regulating the on time of the power transistor according to the off time of the power transistor can include, in every switching cycle, when the off time of the power transistor in the present cycle reaches the maximum value of the present cycle, or when the current sampling signal is less than or equal to the compensation signal which represents the error information of the output signal, turning on the power transistor. Also, in the present operating state, when the on time of the power transistor is timed out, the power transistor may be turned off. Additionally or alternatively, in every switching cycle, when the off time of the power transistor in the present cycle reaches the maximum value of the present cycle, or when the resonance voltage reaches the valley value, the power transistor can be turned on. In addition, in the present operating state, when the on time of the power transistor is timed out, the power transistor may be turned off.

In particular embodiments, a frequency control circuit, a frequency control method, and/or a switching converter, can be utilized in order to regulate the off time of the power transistor in the present cycle according to the on time of the power transistor in the switching converter. In particular embodiments, a frequency control circuit, a frequency control method, and/or a switching converter, can be utilized in order to regulate the on time of the power transistor in the present cycle according to the off time of the power transistor. In this way, the operating frequency of the switching converter may be maintained in a predetermined range, and no slope compensation may be needed in high duty cycle applications, which can reduce overall product costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A frequency control circuit applied in a switching converter, wherein said frequency control circuit is configured to:

a) regulate an off time of a power transistor of said switching converter in one switching cycle according to an on time of said power transistor, or regulate said on time of said power transistor in one switching cycle according to said off time of said power transistor; and b) maintain an operating frequency of said switching converter to be within a predetermined range by a state switching circuit configured to have a plurality of operating states, wherein each operating state has a predetermined off/on time of said power transistor, and said plurality of operating states are switched according to said on/off time of said power transistor in a present cycle, in order to select a matched off/on time of said power transistor.

2. The frequency control circuit of claim 1, wherein when said on time or said off time of said power transistor in a present cycle reaches a maximum value or a minimum value of a present operating state, said switching converter is switched to another operating state.

3. The frequency control circuit of claim 1, wherein one of:
a) when said on time or said off time of said power transistor in a present cycle reaches a maximum value of a present operating state, said switching converter is switched to a next operating state; and
b) when said on time or said off time of said power transistor in said present cycle reaches a minimum value of said present operating state, said switching converter is switched to a previous operating state.

4. The frequency control circuit of claim 1, wherein said frequency control circuit further comprises:
a) a first control signal generator configured to receive a comparison signal and a maximum on time or off time of said power transistor in a present operating state, and to generate a first control signal; and
b) a second control signal generator configured to generate a second control signal according to a predetermined off time or on time of said power transistor in a present operating state;
c) wherein a switching control signal for said power transistor is generated according to said first and second control signals.

5. The frequency control circuit of claim 1, wherein said switching converter comprises one of an isolated buck topology, a non-isolated buck topology, a boost topology, and a buck-boost topology.

6. A method of controlling a frequency of a switching converter, the method comprising:
a) regulating an off time of a power transistor of said switching converter in one switching cycle according to an on time of said power transistor, or regulating said on time of said power transistor in one switching cycle according to said off time of said power transistor;
b) maintaining an operating frequency of said switching converter to be within a predetermined range;
c) presetting a plurality of operating states, wherein each operating state has a predetermined off/on time of said power transistor; and
d) switching between said plurality of operating states according to said on/off time of said power transistor in a present cycle, in order to select a matched off/on time of said power transistor.

7. The method of claim 6, wherein one of said on time and said off time is configured to be adjustable in accordance with the other one of said on time and said off time to maintain said switching frequency within said predetermined range.

8. The method of claim 6, further comprising:
a) setting a plurality of operating states by an adjustable time signal having a maximum time and a minimum time; and
b) controlling said switching converter to operate in a corresponding one of said operating states in accordance with an input voltage and an output voltage of said switching converter.

9. The method of claim 8, further comprising switching an operating state of said switching converter to another corresponding one of said operating states when one of said on time and said off time reaches said maximum time or said minimum time.

10. The method of claim 9, wherein said operating states are set sequentially.

11. The method of claim 8, further comprising:
a) controlling said switching converter in accordance with a next one of a present operating state when one of said on time and said off time reaches said maximum time; and
b) controlling said switching converter in accordance with previous one of said present operating state when one of said on time and said off time reaches said minimum time.

12. The method of claim 8, wherein:
a) each of said operating states further comprises a constant time signal to control one of said on time and off time; and
b) in each of said operating states, the other one of said on time and said off time is controlled by said constant time signal.

13. The method of claim 8, further comprising:
a) turning off said power transistor in every switching cycle when said on time of said power transistor in a present cycle reaches said maximum time of a present operating state, or when a current sampling signal is greater than or equal to a compensation signal that represents error information of an output signal; and
b) turning on said power transistor in said present operating state when said off time of said power transistor has timed out.

14. The method of claim 8, further comprising:
a) turning on said power transistor in every switching cycle when said off time of said power transistor in a present cycle reaches a maximum value of a present operating state, or when a current sampling signal is less than or equal to a compensation signal that represents error information of an output signal; and
b) turning off said power transistor in said present operating state when said on time of said power transistor has timed out.

15. The method of claim 8, further comprising:
a) turning on said power transistor in every switching cycle when said off time of said power transistor in a present cycle reaches a maximum value of a present operating state, or when a resonance voltage reaches a valley value; and
b) turning off said power transistor in said present operating state when said on time of said power transistor has timed out.

* * * * *